United States Patent
Järvensivu et al.

(10) Patent No.: US 10,291,015 B2
(45) Date of Patent: May 14, 2019

(54) ELECTRICAL APPARATUSES WITH CONNECTOR OVERHEATING PROTECTION AND METHODS THEREOF

(71) Applicant: Microsoft Technology Licensing, LLC, Redmond, WA (US)

(72) Inventors: Seppo Järvensivu, Halikko (FI); Esa Eklund, Salo (FI); Teemu Helenius, Riihikoski (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 15/249,329

(22) Filed: Aug. 26, 2016

(65) Prior Publication Data
US 2018/0062381 A1 Mar. 1, 2018

(51) Int. Cl.
*H02H 5/04* (2006.01)
*H01R 24/62* (2011.01)
(Continued)

(52) U.S. Cl.
CPC ......... *H02H 5/045* (2013.01); *H01R 13/6683* (2013.01); *H01R 13/7137* (2013.01);
(Continued)

(58) Field of Classification Search
CPC .... H02H 5/045; H02H 3/085; H01R 13/6683; H01R 13/7137; H01R 24/62; H01R 2107/00; H02J 7/0029
See application file for complete search history.

(56) References Cited

U.S. PATENT DOCUMENTS 6,211,649 B1 4/2001 Matsuda
7,834,590 B2 11/2010 Genin et al.
(Continued)

FOREIGN PATENT DOCUMENTS

DE 102009028941 A1 3/2010
DE 102010026435 A1 1/2012
(Continued)

OTHER PUBLICATIONS

"Keeping iPhone, iPad, and iPod touch within acceptable operating temperatures", Published on: Nov. 25, 2014, 3 pages, Available at: https://support.apple.com/en-us/HT201678.
(Continued)

*Primary Examiner* — Zeev V Kitov

(57) ABSTRACT

Electrical apparatuses with connector overheating protection and methods for protecting electrical apparatuses from connector overheating during current sinking and current sourcing operations are presented. The electrical apparatus includes an electrical connector and a temperature sensor, which is in direct contact with a physical part of the electrical connector. The temperature sensor monitors a temperature of the electrical connector during current sinking and current sourcing operations. During current sinking, if the temperature sensor senses a predetermined level of overheating of the electrical connector, then the sourcing of current to the electrical apparatus is switched off. During current sourcing, if the temperature sensor senses a predetermined level of overheating of the electrical connector, then the sourcing of current to the sinking device is switched off. Switching off the source of current prevents overheating of the electrical connector and protects the electrical apparatus during current sinking and current sourcing operations.

20 Claims, 9 Drawing Sheets

(51) Int. Cl.
  *H01R 13/66*  (2006.01)
  *H01R 13/713*  (2006.01)
  *H02J 7/00*  (2006.01)
  *H01R 107/00*  (2006.01)

(52) U.S. Cl.
  CPC ............ *H01R 24/62* (2013.01); *H02H 5/043* (2013.01); *H02J 7/0029* (2013.01); *H01R 2107/00* (2013.01)

(56) References Cited

U.S. PATENT DOCUMENTS

| | | | |
|---|---|---|---|
| 8,325,454 B2 * | 12/2012 | Brugner | H01R 13/6683 361/103 |
| 8,836,287 B2 | 9/2014 | Smith et al. | |
| 8,943,335 B2 | 1/2015 | Holsen et al. | |
| 9,577,372 B1 * | 2/2017 | Kakish | H01R 13/6205 |
| 2004/0001526 A1 | 1/2004 | Hoffer et al. | |
| 2007/0123316 A1 | 5/2007 | Little | |
| 2009/0051326 A1 | 2/2009 | Wang et al. | |
| 2011/0074355 A1 | 3/2011 | Dao et al. | |
| 2012/0202373 A1 | 8/2012 | Klinghult | |
| 2015/0048804 A1 | 2/2015 | Toivanen et al. | |
| 2015/0180221 A1 * | 6/2015 | Leinonen | H02H 5/04 361/103 |
| 2016/0064978 A1 | 3/2016 | Lei et al. | |
| 2016/0093988 A1 * | 3/2016 | Yue | A41D 1/005 361/86 |
| 2016/0094058 A1 | 3/2016 | Han | |
| 2017/0229820 A1 * | 8/2017 | Fuehrer | H01R 13/6683 |

FOREIGN PATENT DOCUMENTS

| | | |
|---|---|---|
| EP | 2843795 A1 | 3/2015 |
| WO | 2012129104 A1 | 9/2012 |

OTHER PUBLICATIONS

"International Search Report and Written Opinion Issued in PCT Application No. PCT/US2017/047249", dated Nov. 2, 2017, 13 Pages.

* cited by examiner

ELECTRICAL APPARATUSES WITH CONNECTOR OVERHEATING PROTECTION AND METHODS THEREOF

TECHNICAL FIELD

The present application generally relates to current sinking and current sourcing operations associated with electrical apparatuses, and more particularly to mechanisms for protecting electrical apparatuses from connector overheating during current sinking and current sourcing operations.

BACKGROUND

Electrical apparatuses, such as mobile phones for instance, include electrical connectors, which are configured to receive end portions of charging cables to sink power from power supplies. Alternatively, an electrical connector may also enable a respective electrical apparatus to assume the role of a source of power to other electrical apparatuses. For example, a Universal Serial Bus (USB) based electrical connector of a mobile phone may enable the mobile phone to supply power to a USB flash drive when the USB flash drive is connected to the USB based electrical connector of the mobile phone.

In some example scenarios, an electrical connector may undergo overheating during a current sinking or a current sourcing operation, if the electrical connector is damaged and/or a short circuit between charging voltage and ground is caused, for example, due to accumulated dirt in the electrical connector. Typically, device chargers include short circuit protection, however, even few ohms of short circuit before the short circuit protection is triggered may cause overheating of the electrical connector. The overheating of the electrical connector could melt the plastic material around the electrical connector and, in some scenarios, the electrical apparatus may also be damaged. The overheating of the electrical connector, in addition to ruining a user experience of using the electrical apparatus, may also be a potential safety hazard for the user.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, an electrical apparatus with connector overheating protection is presented. The electrical apparatus includes an electrical connector and a temperature sensor. The electrical connector includes a shell and at least one signal pin. The at least one signal pin is capable of controlling sinking or sourcing of current. The temperature sensor is in direct contact with a physical part of the electrical connector. The temperature sensor is configured to sense a predetermined level of overheating of the electrical connector and to indicate via the at least one signal pin to a power source to switch off the sourcing of current to the electrical apparatus.

In another embodiment, an electrical apparatus with connector overheating protection is presented. The electrical apparatus includes an electrical connector and a temperature sensor. The electrical connector includes a shell and at least one signal pin. The at least one signal pin is capable of controlling sinking or sourcing of current. The temperature sensor is in direct contact with a physical part of the electrical connector. The temperature sensor is configured to sense a predetermined level of overheating of the electrical connector and cause a switching off of a sourcing of current from the electrical apparatus to a sinking device.

In an embodiment, a method for protecting electrical apparatuses during current sinking and current sourcing operations is presented. The method includes detecting, by an electrical apparatus, a connection of a sinking device or a sourcing device with an electrical connector disposed in the electrical apparatus. A temperature sensor is in direct contact with a physical part of the electrical connector. The method includes monitoring, by the electrical apparatus, a temperature of the electrical connector using the temperature sensor upon detecting the connection. The monitoring of the temperature is performed to sense a predetermined level of overheating of the electrical connector. The method further includes causing, by the electrical apparatus, a switching off of a source of current if the electrical apparatus is sinking current from the sourcing device or switching off of a sourcing of current to the sinking device upon sensing the predetermined level of overheating of the electrical connector.

Many of the attendant features will be more readily appreciated, as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The various embodiments disclosed herein suggest electrical apparatuses with connector overheating protection and methods for protecting electrical apparatuses from connector overheating during current sinking and/or current sourcing operations. In one embodiment, the electrical apparatus includes an electrical connector and a temperature sensor, which is in direct contact with a physical part of the electrical connector. The temperature sensor monitors a temperature of the electrical connector during current sinking and current sourcing operations. During current sinking, if the temperature sensor senses a predetermined level of overheating of the electrical connector then a configuration channel (CC) signal line of the electrical connector is disconnected. The disconnection of the CC signal line may be achieved using either hardware or software mechanisms. The disconnection of the CC signal line serves as an indication to a power source to switch off the sourcing of current to the electrical apparatus. During current sourcing, if the temperature sensor senses a predetermined level of overheating of the electrical connector, then the sourcing of current to the sinking device is switched off by disconnecting the voltage bus source from the electrical connector. Switching off the source of current prevents overheating of the electrical connector and protects the electrical apparatus during current sinking and current sourcing operations.

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
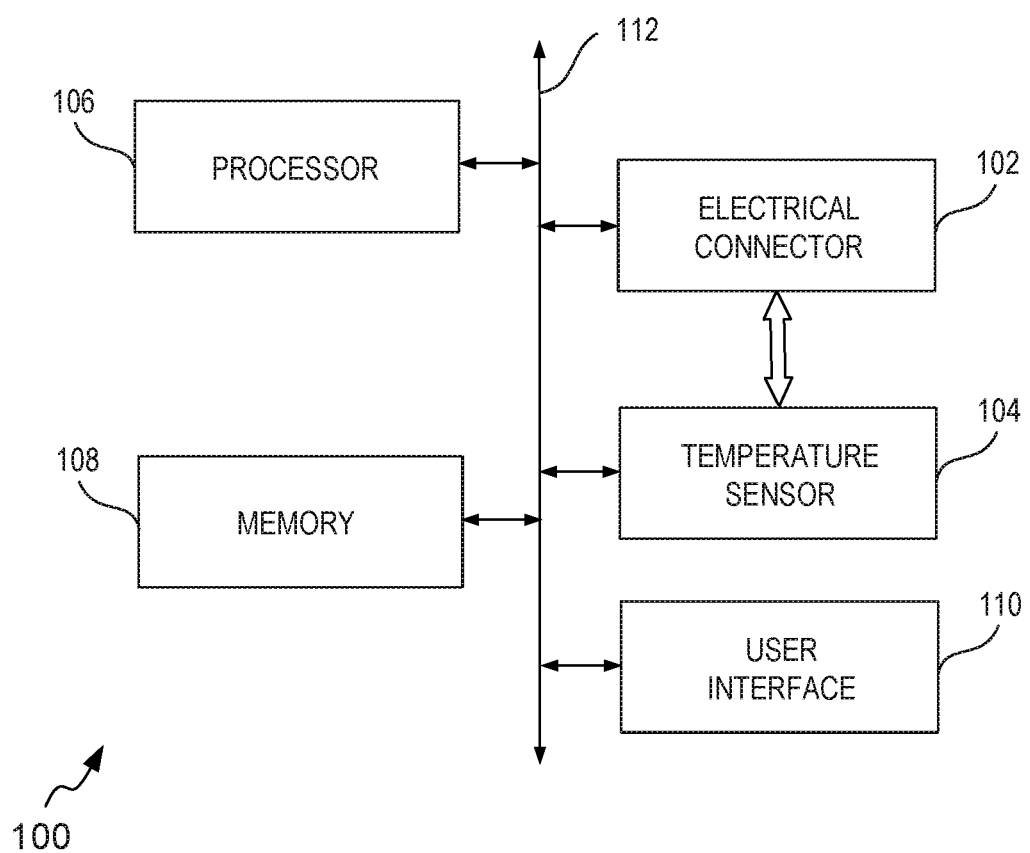
FIG. 1 is a block diagram of an electrical apparatus, in accordance with an example embodiment.

FIG. 1 is a block diagram of an electrical apparatus 100, in accordance with an example embodiment. The electrical apparatus 100 is depicted to include an electrical connector 102, a temperature sensor 104, a processor 106, a memory 108 and a user interface 110. The various components of the electrical apparatus 100, such as the electrical connector 102, the temperature sensor 104, the processor 106, the memory 108 and the UI 110 are depicted to communicate with each other via a centralized circuit system 112. The centralized circuit system 112 may be various devices configured to, among other things, provide or enable communication between the components of the electrical apparatus 100. In certain embodiments, the centralized circuit system 112 may be a central printed circuit board (PCB) such as a motherboard, a main board, a system board, or a logic board. The centralized circuit system 112 may also, or alternatively, include other printed circuit assemblies (PCAs) or communication channel media.

In at least one example embodiment, the electrical apparatus 100 may be embodied as a communication device, a computing device or a personal utility device. For example, the electrical apparatus 100 may be embodied as a mobile phone, a smartphone, a tablet computer, a laptop, a wearable device, a camera device or a personal digital assistant. In some embodiments, the various components configuring the electrical apparatus 100 may be disposed within an electronic device and configured to provide connector overheating protection to the electronic device during current sinking and current sourcing operations. Some non-limiting examples of the electronic device include a laptop, a camera, a tablet computer, a mobile phone, a smartphone, a personal digital assistant, a wearable device and the like.

In at least one example embodiment, the electrical connector 102 is a Universal Serial Bus (USB) connector. In an illustrative example, the electrical connector 102 is a USB Type C connector. In at least one example embodiment, the temperature sensor 104 is configured to be in direct contact with a physical part of the electrical connector 102 to continuously monitor a temperature of the electrical connector 102. In an illustrative example, the temperature sensor 104 may include a Negative Temperature coefficient (NTC) thermistor for facilitating measurement of temperature of the electrical connector 102. It is noted that the NTC thermistor is a thermally sensitive resistor whose resistance exhibits a large, precise and predictable decrease as the temperature of the resistor increases over an operating temperature range (typically −55° C. to 200° C.). Various materials may be used for fabricating the NTC thermistor, such as Platinum, Nickel, Cobalt, Iron and oxides of Silicon, used as pure elements or as ceramics and polymers. Further, a size of the NTC thermistor may be configured to be minimal (for example, in order of 0.2 mm×0.5 mm×0.1 mm) so as to facilitate ease of fastening the temperature sensor 104 to a physical part of the electrical connector 102.

Figure 2:
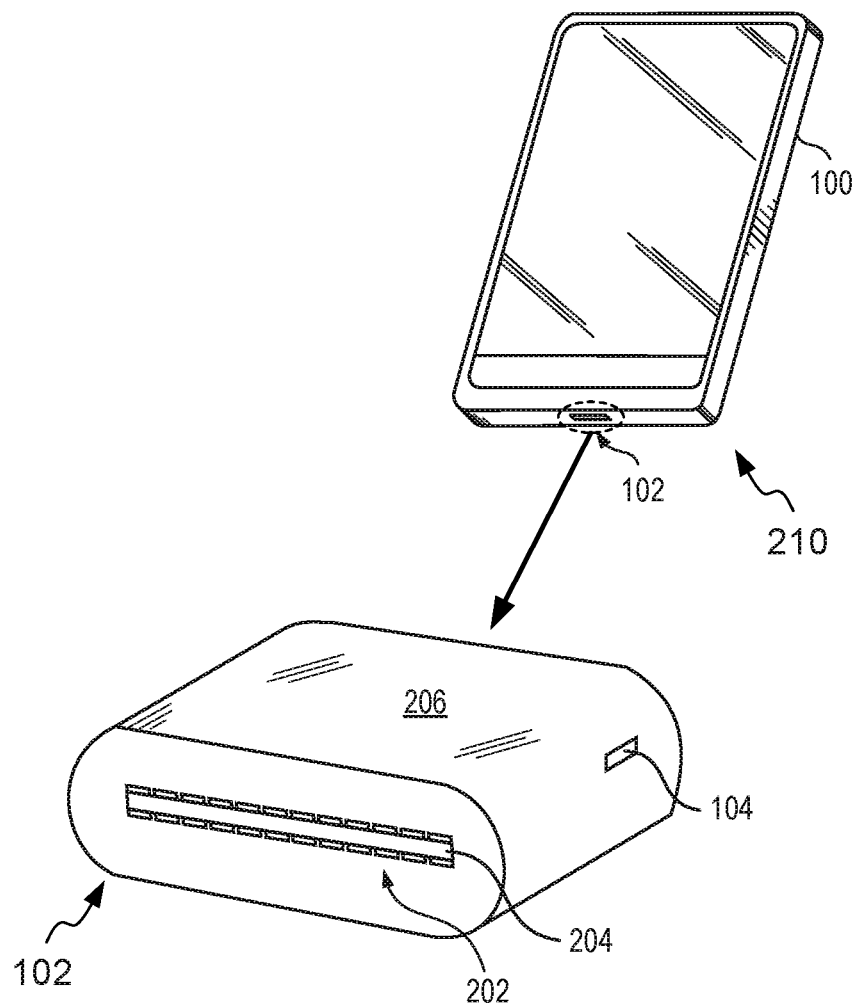
FIG. 2 shows a simplified representation of an electrical connector embodied as USB Type C connector, in accordance with an example embodiment.

An example electrical connector 102 with the temperature sensor 104 in direct contact with a physical part of the electrical connector 102 is depicted in FIG. 2.

Referring now to FIG. 2, a simplified representation of the electrical connector 102 embodied as USB Type C connector is shown, in accordance with an example embodiment. The electrical connector 102 includes a plurality of signal pins 202, for performing various functions such as establishing connection with other electronic devices, sending and receiving data, sourcing and sinking of power (i.e. current) and the like.

The plurality of signal pins 202 are disposed on a pin substrate 204 (for example, a printed circuit board) and the entire pin assembly including the pin substrate 204 and the plurality of signal pins 202 is housed in a shell 206, which serves as protective cover for the pin assembly disposed inside. In at least one embodiment, the shell 206 is composed of metal body, which serves to provide 'grounding' for current, handled by various signal pins from among the plurality of signal pins 202. In an illustrative example, the shell 206 may be composed of IC 804 Stainless steel material. However, any other metallic (either alloy or composite) material may also be used to configure body of the shell 206.

In at least one example embodiment, at least one signal pin from among the plurality of signal pins 202 corresponds to a configuration channel (CC) pin (not shown in FIG. 2). The CC pin is associated with a CC signal line and is configured to establish the role of the electrical apparatus 100 as a current sink or a current source. The term 'current sink' as used herein refers to receiver of current (or in other words, receiver of power), whereas the term 'current source' as used herein refers to a supplier of current (or power) to another device. It is noted that the electrical apparatus 100 may assume the role of a current sink as well as current source. In at least one embodiment, the manner in which a USB device (for example, a charging cable or another electronic device like a micro SD card) is connected to the electrical connector 102 of the electrical apparatus 100 establishes whether the electrical apparatus 100 will assume the role of a current sink or current source. Typically, an electrical connector of an electrical apparatus such as a mobile phone includes two CC signal lines emanating from two CC signal pins. When a phone charger is connected to the electrical connector of the mobile phone, one CC signal line is actuated, thereby establishing the role of the electrical connector (or that of the mobile phone) as the current sink. Alternatively, when a USB flash drive is connected to the electrical connector, another CC signal line from among the two CC signal lines is actuated thereby establishing the role of the electrical connector (or of the mobile phone) as a current source. Thus, the CC signal pin along with the associated CC signal line is configured to control a sinking or sourcing of current by establishing the role of the electrical connector 102, or, more specifically of the electrical apparatus 100 including the electrical connector 102.

The temperature sensor 104, as explained with reference to FIG. 1, is configured to be disposed in direct contact with a physical part of the electrical connector 102. In FIG. 2, the temperature sensor 104 is depicted to be integrated in the shell 206 of the electrical connector 202. It is noted that in some embodiments, the temperature sensor 104 may also be disposed in other physical parts of the electrical connector 102. For example, the temperature sensor 104 may be configured to be direct contact with the at least one signal pin, such as the CC pin, or with the pin substrate 204. In some example scenarios, the temperature sensor 104 may be disposed on the pin substrate 204 adjoining the plurality of signal pins 202 or at a portion (not shown in FIG. 2) behind the placement of the plurality of signal pins 202.

An example placement of the electrical connector 102 on the electrical apparatus 100 is exemplarily depicted in an inset view 210 in FIG. 2. The temperature sensor 104, in direct contact with a physical part of the electrical connector 102, is not shown in the inset view 210. As explained above, the temperature sensor 104 may be integrated in the shell 206 of the electrical connector 102 or may be disposed in direct contact with the CC pin or with the pin substrate 204 of the electrical connector 102. It is noted that the electrical apparatus 100 is depicted to be a mobile phone for illustration purposes. Moreover, a placement of the electrical connector 102 may vary depending upon design requirements of the respective electrical apparatuses and should not be limited to the placement of the electrical connector 102 depicted in the inset view 210.

Referring again to FIG. 1, in at least one example embodiment, the memory 108 is capable of storing machine executable instructions. Further, the processor 106 is capable of executing the stored machine executable instructions. The processor 106 may be embodied in a number of different ways. In an embodiment, the processor 106 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 106 utilizes computer program code to cause the electrical apparatus 100 to perform one or more actions.

The memory 108 may be embodied as one or more volatile memory devices, one or more non-volatile memory devices or a combination of one or more volatile memory devices and non-volatile memory devices. For example, the memory 108 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

In at least one example embodiment, the UI 110 may be embodied as a display screen. Examples of the display screen may include, but are not limited to, a light emitting diode display screen, a thin-film transistor (TFT) display screen, a liquid crystal display screen, an active-matrix organic light-emitting diode (AMOLED) display screen and the like. The UI 110 may be configured to display content such as notifications related to new device connections, charging status etc., in addition to displaying multimedia content, such as audio/video content, textual content, etc.

It is noted that the electrical apparatus 100 may include fewer or more components than those depicted in FIG. 1. For example, in at least one example embodiment, the electrical apparatus 100 may only include the electrical connector 102 and the temperature sensor 104 in direct contact with a physical part of the electrical connector 102. The electrical apparatus 100 including only the electrical connector 102 and the temperature sensor 104 may be disposed in an electronic device and the various components of the electronic device, such as a processor, a memory and a UI, may communicate with the electrical apparatus 100 to execute operations as described herein.

As explained above, the temperature sensor 104 is configured to measure a temperature of the electrical connector 102. In at least one example embodiment, the temperature sensor 104 is configured to sense a predetermined level of overheating of the electrical connector 102. The term 'predetermined level of overheating' as used herein implies a temperature or a temperature range that is beyond an acceptable range of operation of the electrical connector 102. For example, a temperature of 60° C. for the electrical connector 102 may be too hot to touch for the user and as such, a temperature of 60° C. or a temperature beyond this temperature may configure the predetermined level of overheating for the electrical connector 102. In some embodiments, the electrical connector 102 may also include plastic parts for which the acceptable temperature limit may be up to 75° C. (in some example scenarios, the plastic parts may melt over 100° C.). Accordingly, the predetermined level of overheating may be chosen to be a minimum value from among all acceptable temperature limits corresponding to various material parts associated with the electrical connector 102.

In at least one example embodiment, for sensing the predetermined level of overheating, the temperature sensor 104 may be configured to determine a current temperature reading for the electrical connector 102 and compare the current temperature reading with a reference temperature threshold value. The reference temperature threshold value may be chosen to be slightly less than or equal to the temperature corresponding to the predetermined level of overheating. Accordingly, the predetermined level of overheating of the electrical connector may be sensed if the current temperature reading is greater than the reference temperature threshold value. In at least one example embodiment, the temperature sensor 104 is configured to indicate via the CC pin to a power source to switch off a power supply to the electrical apparatus 100 when the electrical connector 102 is used as a current sink. To that effect, a CC signal line associated with the CC pin may be disconnected upon sensing of the predetermined level of overheating of the electrical connector. The disconnection of the CC signal line may serve to indicate that the electrical apparatus 100 is disconnected from the power source and accordingly the power source may be caused to switch off the power supply (i.e. the sourcing of current to the electrical apparatus 100 may be stopped as the current sink is disconnected). The provisioning of the indication to switch off the power supply when the electrical apparatus 100 is being used as a current sink is further explained with reference to FIGS. 3 and 4.

Figure 3:
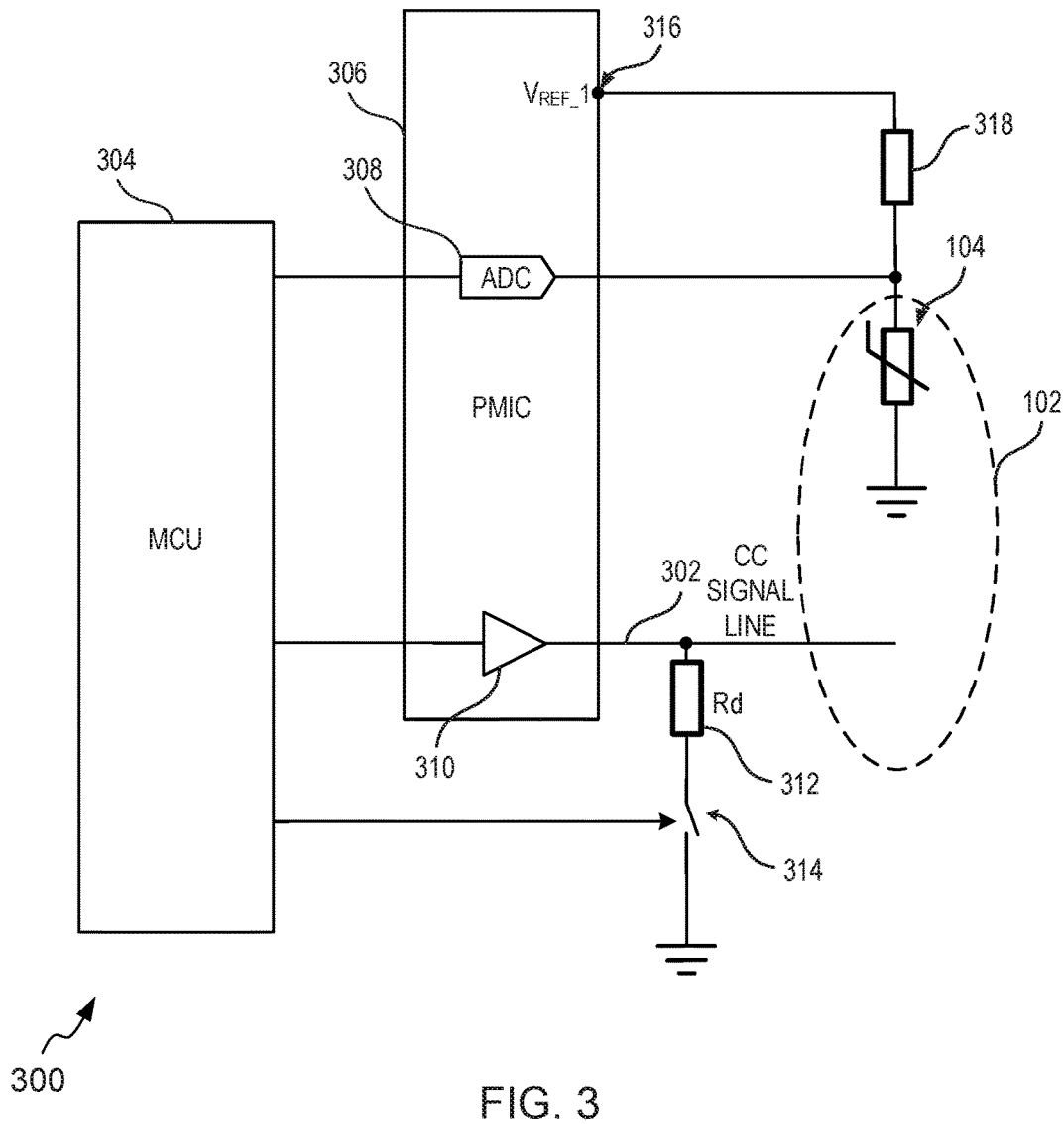
FIG. 3 shows a simplified circuit representation of the electrical apparatus of FIG. 1 for illustrating an interrupt signal based disconnection of a CC signal line, in accordance with an example embodiment.

FIG. 3 shows a simplified circuit representation 300 of the electrical apparatus 100 of FIG. 1 for illustrating an interrupt signal based disconnection of a CC signal line, in accordance with an example embodiment. The circuit representation 300 shows the electrical connector 102 and the temperature sensor 104 directly coupled with the electrical connector 102. The temperature sensor 104 may be in direct contact with the physical part of the electrical connector 102 as explained with reference to FIGS. 1 and 2. Further, as explained above, the electrical connector 102 includes a CC pin (not shown in FIG. 3) among a plurality of pins (such as the plurality of pins 202 of FIG. 2) and the CC pin is associated with a CC signal line. Accordingly, the electrical connector 102 is depicted to be associated with a CC signal line 302. The CC signal line 302 may be configured to convey information related to the connection of another device to the electrical connector 102 to a microcontroller unit (MCU) 304 and a Power Management Integrated Circuit (PMIC) 306, and may facilitate establishing of the role of the electrical apparatus 100 as a current sink or a current source.

The MCU 304 is configured to execute machine executable instructions stored in the memory 108 (shown in FIG. 1). The MCU 304 may be implemented in a number of different ways. In an embodiment, the MCU 304 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a hardware accelerator, a special-purpose computer chip, or the like. In an embodiment, the MCU 304 may, at least in part, configure the processor 106 explained with reference to FIG. 1.

The PMIC 306 is an integrated circuit configured to manage power requirements of the electrical apparatus 100. In an illustrative example, the PMIC is configured to perform battery management, voltage regulation (for example, voltage scaling), and charging functions for the electrical apparatus 100. The PMIC 306 is depicted to include an analog to digital (ADC) converter 308 and a buffer 310. The buffer 310 is configured to hold the signal in the CC pin of the electrical connector 102 for processing by the PMIC 306. It is noted that the PMIC 306 is depicted to include only the ADC convertor 308 and the buffer 310 for illustration purposes. It is noted that the MCU 304 and the PMIC 306 may include several other discrete components.

The CC signal line 302 is further associated with a pull-down resistor ($R_d$) 312 and an active low switch 314 (hereinafter referred to as switch 314). In an embodiment, the MCU 304 controls the $R_d$ 312 connected to the CC signal line 302 by means of the switch 314. In an illustrative example, the switch 314 is a field effect transistor, such as for example, a P-type junction field effect transistor (JFET).

The temperature sensor 104 is depicted to be connected to a reference voltage (shown as $V_{REF\_1}$ 316) via a resistor 318. In an embodiment, the temperature of the electrical connector 102 is constantly monitored by the temperature sensor 104 and compared with a reference temperature threshold value. If the temperature sensor 104 senses a predetermined level of overheating, then the temperature sensor 104 may be configured to provide an interrupt signal, which may be provisioned via the ADC 308 to the MCU 304. In an embodiment, upon receiving the interrupt signal, the MCU 304 may be caused to turn off the switch 314 that disconnects the $R_d$ 312 from the ground, thereby causing the CC pin to go high. The CC pin going high (i.e. in open circuit state) disconnects the CC signal line 302 thereby indicating to the power source that the electrical apparatus 100 is disconnected from the power source and causes the power source to switch off the sourcing of current to the electrical apparatus 100.

The disconnection of the CC signal line 302 upon sensing of the predetermined level of overheating of the electrical connector 102 may also be performed while precluding the provisioning of the interrupt signal. Such a scenario is explained with reference to FIG. 4.

Figure 4:
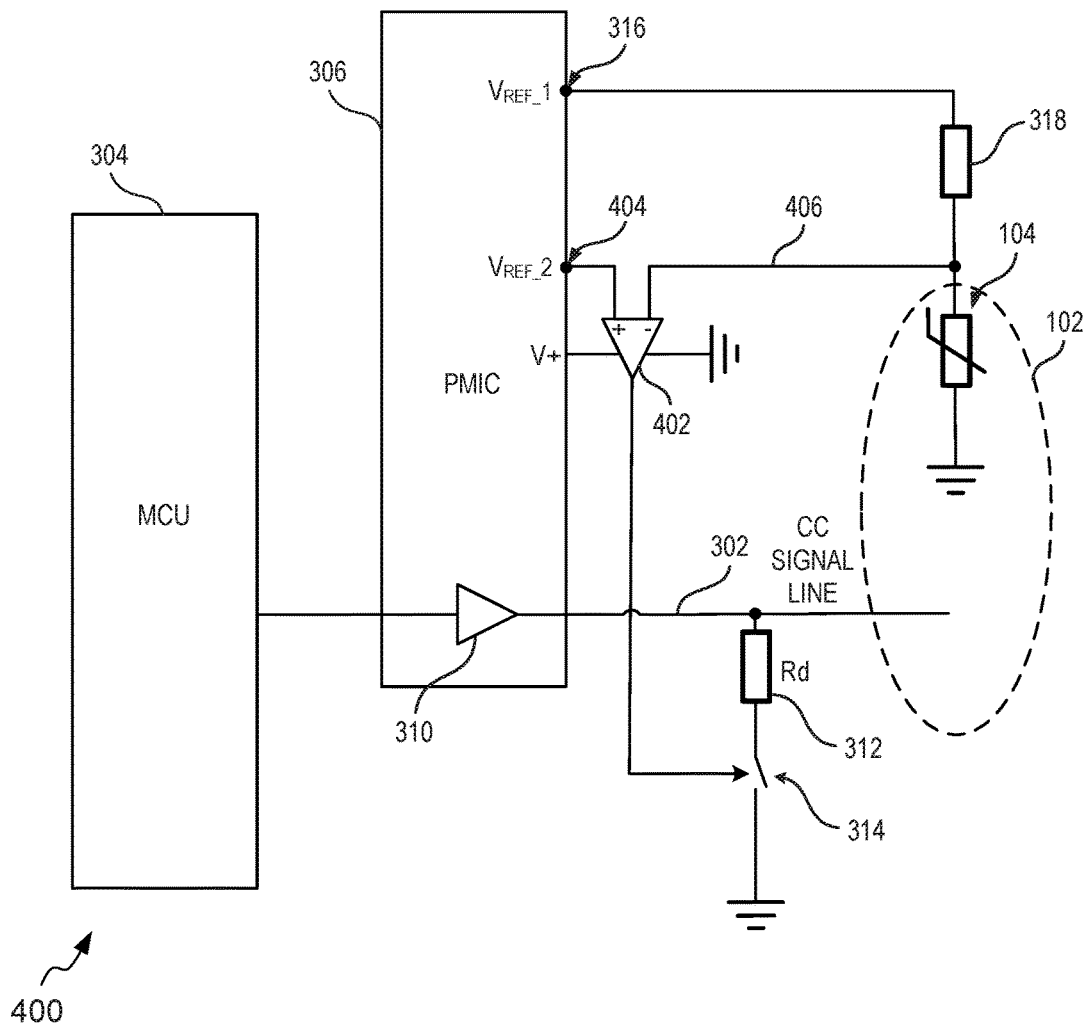
FIG. 4 shows a simplified circuit representation of the electrical apparatus of FIG. 1 for illustrating a direct disconnection of a CC signal line, in accordance with an example embodiment.

FIG. 4 shows a simplified circuit representation 400 of the electrical apparatus 100 of FIG. 1 for illustrating a direct disconnection of a CC signal line, in accordance with an example embodiment. The term 'direct disconnection' as used herein implies a non-interrupt signal based disconnection or a 'hardware' based disconnection of the CC signal line as opposed to the interrupt signal based or software based disconnection of the CC signal line explained with reference to FIG. 3. The circuit representation 400 includes the electrical connector 102, the temperature sensor 104, the CC signal line 302, the MCU 304, the PMIC 306, the buffer 310, the $R_d$ 312, the switch 314, $V_{REF\_1}$ 316 and the resistor 318. These circuit elements are explained with reference to the circuit representation 300 in FIG. 3 and are not explained again herein. Further, just like the circuit representation 300, the circuit representation 400 is shown to illustrate a switching off of a sourcing of current by a power source to the electrical apparatus 100, which is being used as a current sink. The electrical connector 102 connects the electrical apparatus 100 to a power source (not shown in FIG. 4) for sinking of current.

The circuit representation 400 further depicts a comparator 402, which is configured to compare a voltage reference $V_{REF\_2}$ 404 with a voltage 406 corresponding to the sensed temperature from the temperature sensor 104. If based on the comparison, it is determined that voltage corresponding to the sensed temperature is smaller, implying that the current temperature reading is greater than the reference temperature threshold value, then a predetermined level of overheating of the electrical connector 102 is sensed. The comparator 402 may be configured to directly control the $R_d$ 312 using the switch 314. It is noted that the $R_d$ 312 is configured to hold the CC pin of the electrical connector 102 low when the switch 314 is closed. The $R_d$ 312 pulls the CC pin of the electrical connector low thereby sustaining electrical connection between the electrical apparatus 100 and the power source. A control signal from the comparator 402 drives the switch 314 to switch on when the sensed temperature is less than reference temperature threshold value. Alternatively, a control signal from the comparator 402 may be configured to turn off the switch 314, when the predetermined level of overheating is sensed and that disconnects the $R_d$ 312 from the ground, thereby causing the CC pin to go high. The CC pin going high disconnects the CC signal line 302 thereby indicating to the power source to switch off sourcing of current to the electrical apparatus 100.

The circuit representations 300 and 400 depicted in FIGS. 3 and 4 suggest an interrupt signal (or a software) based approach and a direct (or a hardware) approach, respectively for switching off the power supply to the electrical apparatus 100 (i.e. current sink) upon sensing the predetermined level of overheating of the electrical connector 102. The switching off of the power supply protects the electrical connector 102 and the electrical apparatus from damage and/or from other adverse effects during sinking of current. However, in some scenarios, the electrical apparatus 100 is configured to serve as a source of power (i.e. a current source) to other sinking devices. The protection of the electrical apparatus 100 in such a scenario is explained with reference to FIGS. 5 and 6.

Figure 5:
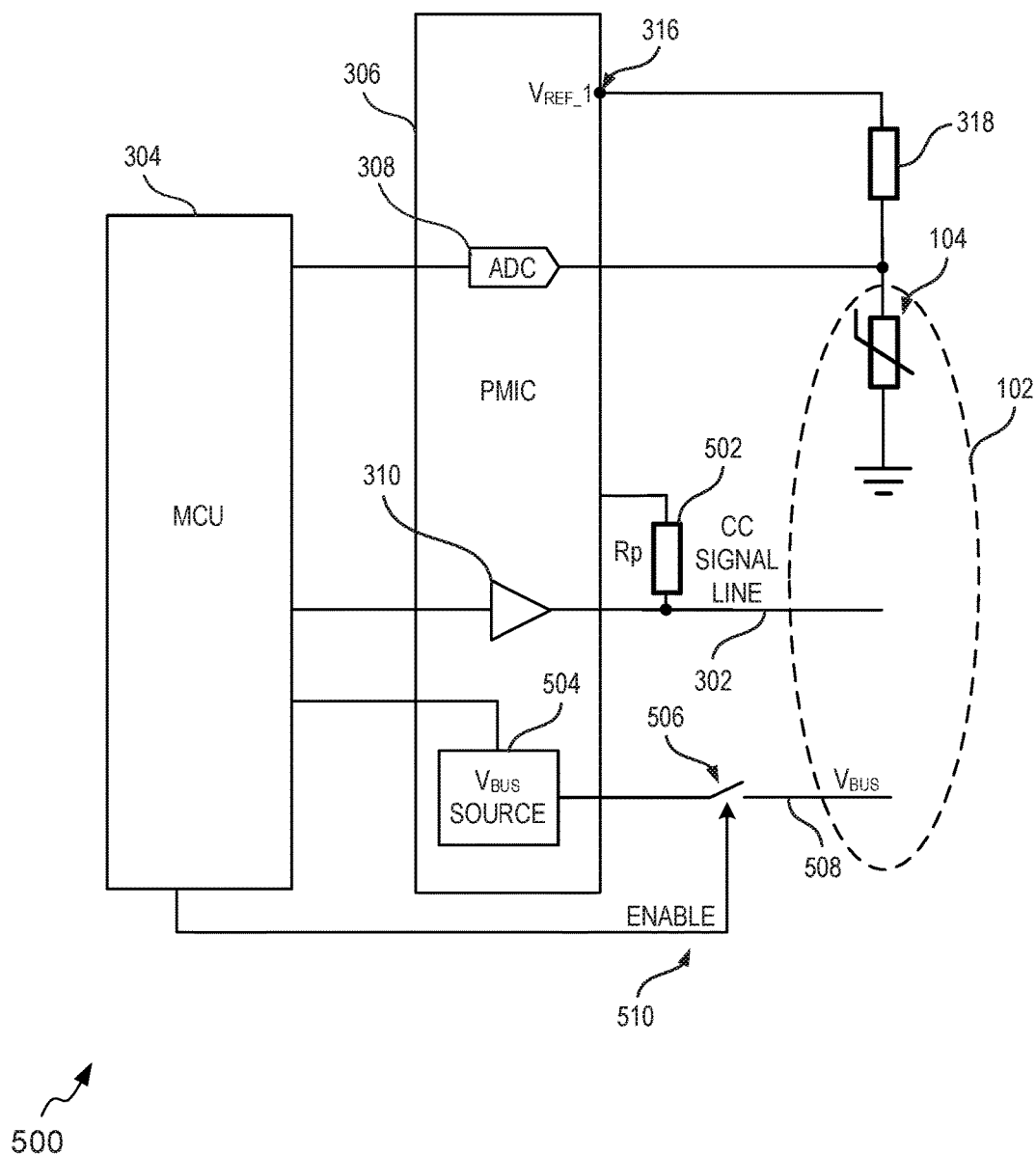
FIG. 5 shows a simplified circuit representation of the electrical apparatus of FIG. 1 for illustrating disconnection of a voltage bus source for switching off a sourcing of current to a sinking device, in accordance with an example embodiment.

FIG. 5 shows a simplified circuit representation 500 of the electrical apparatus 100 of FIG. 1 for illustrating disconnection of a voltage bus ($V_{BUS}$) source for switching off a sourcing of current to a sinking device, in accordance with an example embodiment. The circuit representation 500 depicts the electrical connector 102, the temperature sensor 104, the CC signal line 302, the MCU 304, the PMIC 306, the ADC 308, the buffer 310, the $V_{REF\_1}$ 316 and the resistor 318. These circuit elements are explained with reference to the circuit representation 300 in FIG. 3 and are not explained again. The CC signal line 302 is depicted to be associated with a pull-up resistor ($R_p$) 502, which is configured to hold the CC signal line 302 high so as to enable the electrical apparatus 100 to source current to a sinking device (for example, a USB flash drive). The PMIC 306 is further depicted to include a voltage source 504 (for example, a 5-volt or 5V supply). The voltage source 504 is associated with a voltage bus ($V_{BUS}$) 508 and is hereinafter referred to as a $V_{BUS}$ source 504. The $V_{Bus}$ 508 is connected to the $V_{BUS}$ source 504 through an active low switch 506 (hereinafter referred to as switch 506). The $V_{BUS}$ source 504 is configured to source current using the $V_{BUS}$ 508 to the electrical connector 102 and from the electrical connector 102 to the sinking device (not shown in FIG. 5).

In an embodiment, the MCU 304 is configured to receive the temperature reading (for example, an ADC value) of the electrical connector 102 through the PMIC 306. Based on the ADC value, the MCU 304 may be configured to sense the predetermined level of overheating of the electrical connector 102 and disconnect the $V_{BUS}$ source 504 from the electrical connector 102 by setting the switch 506 into non-conductive state via an ENABLE signal (depicted in FIG. 5 as 'ENABLE' 510).

The disconnection of $V_{BUS}$ source 504 from the electrical connector 102 causes the sourcing of current to the sinking device to be switched off. Further, the disconnection of the $V_{BUS}$ source 504 from the electrical connector 102 causes the disconnection of $R_p$ 502 to indicate to the sinking device of the non-availability of the $V_{BUS}$ source 504. The switching off the sourcing of current prevents overheating of the electrical connector 102 and protects the electrical connector 102 and the corresponding electrical apparatus from adverse effects.

The disconnection of the $V_{BUS}$ source 504 may also be performed while precluding the provisioning of the 'ENABLE' signal. Such a scenario is explained with reference to FIG. 6.

Figure 6:
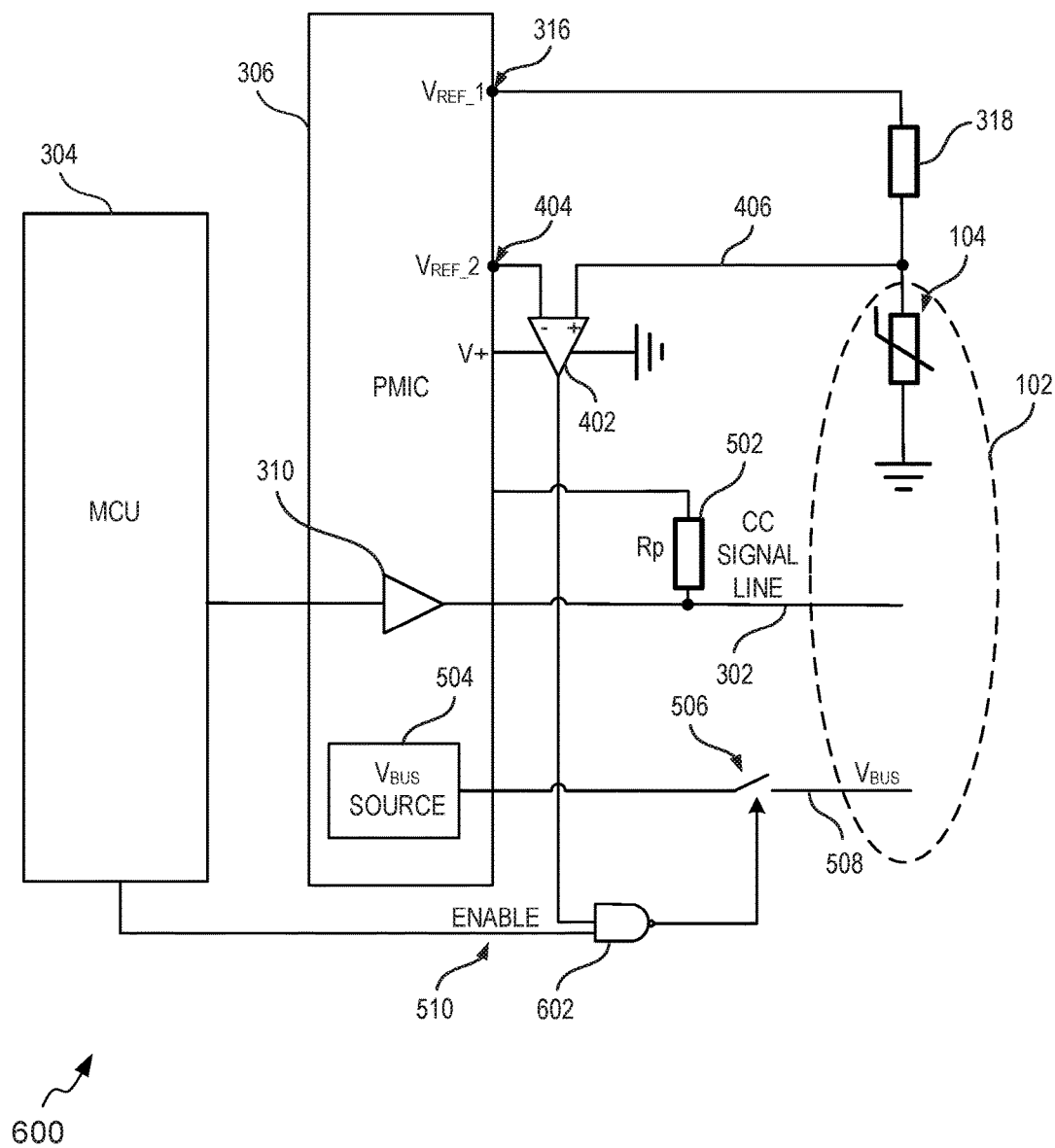
FIG. 6 shows a simplified circuit representation of the electrical apparatus of FIG. 1 for illustrating disconnection of a voltage bus source for switching off a sourcing of current to a sinking device, in accordance with another example embodiment.

FIG. 6 shows a simplified circuit representation 600 of the electrical apparatus 100 of FIG. 1 for illustrating disconnection of the $V_{BUS}$ source 504 for switching off a sourcing of current to a sinking device, in accordance with another example embodiment. The circuit representation 600 depicts the electrical connector 102, the temperature sensor 104, the CC signal line 302, the MCU 304, the PMIC 306, the buffer 310, the $V_{REF\_1}$ 316 and the resistor 318. These circuit elements are explained with reference to the circuit representation 300 in FIG. 3 and are not explained again. The circuit representation 600 further depicts the comparator 402, $V_{REF\_2}$ 404, voltage 406 explained with reference to FIG. 4 and the $V_{BUS}$ source 504, the switch 506 and the $V_{BUS}$ 508 explained with reference to FIG. 5. These circuit elements are not explained again herein.

In an embodiment, the comparator 402 is configured to compare voltage over the temperature sensor 104 and $V_{REF\_2}$ 404. If the temperature of the electrical connector 102 rises above the predefined threshold output (i.e. a predetermined level of overheating is sensed), then the comparator 402 goes low causing an output of a NAND gate 602 to go high and disconnect the switch 506 regardless of the state of ENABLE signal 510. It is noted that the $V_{BUS}$ source 504 is only connected to electrical connector 102 if both output signals from MCU 304 and the comparator 402 are high.

The disconnection of the $V_{BUS}$ source 504 from the electrical connector 102 causes the sourcing of current to the sinking device to be switched off. Further, as explained with reference to FIG. 5, the disconnection of the $V_{BUS}$ source 504 from the electrical connector 102 causes the disconnection of $R_p$ 502 to indicate to the sinking device of the non-availability of the $V_{BUS}$ source 504. The switching off the sourcing of current prevents overheating of the electrical connector 102 and protects the electrical connector 102 and the corresponding electrical apparatus from adverse effects.

Referring now to FIG. 1, in at least one example embodiment, the electrical apparatus 100 may be caused to display a notification, via the UI 110, alerting a user of the electrical apparatus 100 of the switching off of the sinking of current, when the electrical apparatus 100 is connected to a power supply. For example, a notification, such as 'The charging of your device has stopped', may be displayed to the user with appropriate reason (for example, a reason causing the overheating of the electrical connector 102 such as a damage to the electrical connector 102 etc.). Similarly, in at least one example embodiment, the electrical apparatus 100 may be caused to display a notification, via the UI 110, alerting the user of the electrical apparatus 100 of the switching off of the sourcing of current to a sinking device, when the electrical apparatus 100 is connected to another sinking device.

A method for protecting electrical apparatuses from connector overheating during current sinking and/or current sourcing operations is explained with reference to FIG. 7.

Figure 7:
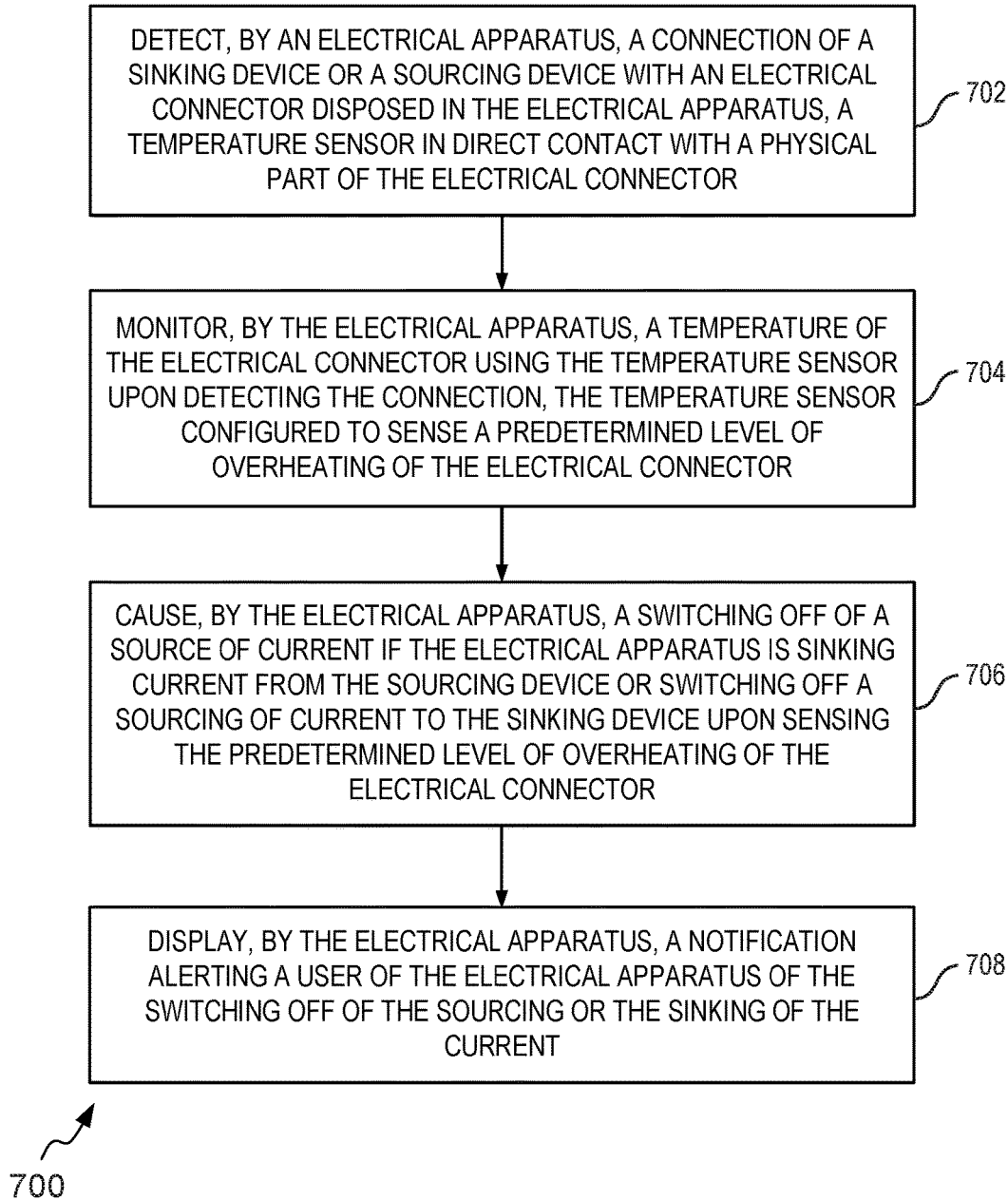
FIG. 7 illustrates an example flow diagram of a method for protecting an electrical apparatus from connector overheating during current sinking and current sourcing operations, in accordance with an example embodiment.

FIG. 7 illustrates an example flow diagram of a method 700 for protecting electrical apparatuses from connector overheating during current sinking and/or current sourcing operations, in accordance with an example embodiment. The method 700 starts at 702.

At 702, the method 700 includes detecting, by an electrical apparatus, a connection of a sinking device or a sourcing device with an electrical connector disposed in the electrical apparatus. As explained with reference to FIGS. 1 to 6, an electrical connector, such as the electrical connector 102, of the electrical apparatus 100 may be connected to various devices, such as power supply cables, other electrical apparatuses etc. In an illustrative example, the electrical connector may be a USB Type C connector including a shell and configuration channel (CC) pins configured to detect the connection of the electrical apparatus to a sourcing device or a sinking device and establish the role of the electrical apparatus as a current sink or a current source when a device is connected to the electrical apparatus via the electrical connector. More specifically, the manner in which a USB device (for example, a charging cable or another electronic device like a micro SD card) is connected to the electrical connector of the electrical apparatus facilitates detection of the connection of the electrical apparatus to a sourcing device or a sinking device. The detection of the connection establishes whether the electrical apparatus will assume the role of a current sink or a current source. Typically, an USB electrical connector of an electrical apparatus such as a mobile phone includes two CC signal lines emanating from two CC signal pins. When a phone charger is connected to the electrical connector of the mobile phone, one CC signal line is actuated, causing detection of a connection of sourcing device and establishing the role of the electrical connector (or that of the mobile phone) as the current sink. Alternatively, when a USB flash drive is connected to the USB electrical connector, another CC signal line from among the two CC signal lines is actuated causing detection of connection of a sinking device and establishing the role of the electrical connector (or the mobile phone) as a current source.

Further, a temperature sensor is in direct contact with a physical part of the electrical connector. As explained with reference to FIG. 2, the temperature sensor may be integrated in a shell of the electrical connector or may be disposed to be direct contact with the CC pin or with the pin substrate bearing the CC pin.

At 704, the method 700 includes monitoring, by the electrical apparatus, a temperature of the electrical connector using the temperature sensor upon detecting the connection. The temperature sensor is configured to be disposed in direct contact with a physical part of the electrical connector to sense a predetermined level of overheating of the electrical connector. In an embodiment, the temperature sensor is configured to determine a current temperature reading of the electrical connector and compare the current temperature reading with a reference temperature threshold value. If the current temperature reading is greater than the reference temperature threshold value then the temperature sensor is configured to sense a predetermined level of overheating of the electrical connector.

At 706, the method 700 includes causing, by the electrical apparatus, a switching off a source of current if the electrical apparatus is sinking current from the sourcing device or switching off a sourcing of current to the sinking device upon sensing the predetermined level of overheating of the electrical connector. More specifically, the supply of current to the electrical apparatus, during current sinking, or supply of current to another electrical apparatus, during current sourcing, may be stopped to protect the electrical apparatus from damage from the overheating of the electrical connector. During current sinking, the switching off of the power supply may be achieved by disconnecting a CC signal line associated with a CC pin. The disconnecting of the CC signal line serves to indicate to the power source to switch off the supply of power, as the connection to the current sink is lost. In at least one embodiment, the temperature sensor may be caused to effect a provisioning of an interrupt signal to an associated processor to cause disconnection of pull-down resistor associated with the CC signal line to disconnect the CC signal line. Such a scenario is explained with reference to FIG. 3. In another embodiment, the temperature sensor may be caused to directly disconnect the pull-down resistor using a switch to disconnect the CC signal line. Such a scenario is explained with reference to FIG. 4.

In an embodiment, the electrical apparatus may be serving as a current source to a sinking device. In such a scenario, upon sensing a predetermined level of overheating, the electrical apparatus 100 may be caused to disconnect the $V_{BUS}$ source from the electrical connector either by using an ENABLE signal as explained with reference to FIG. 5 or by directly turning off a switch connecting the $V_{BUS}$ source to the electrical connector as explained with reference to FIG. 6.

At 708, the method 700 includes displaying, by the electrical apparatus, a notification alerting a user of the electrical apparatus of the switching off of the source of current. For example, a notification, such as 'The charging of your device has stopped', may be displayed to the user with appropriate reason causing the overheating of the electrical connector 102 (such as for example, the electrical connector 102 may be damaged etc.). The method stops at 708.

Figure 8:
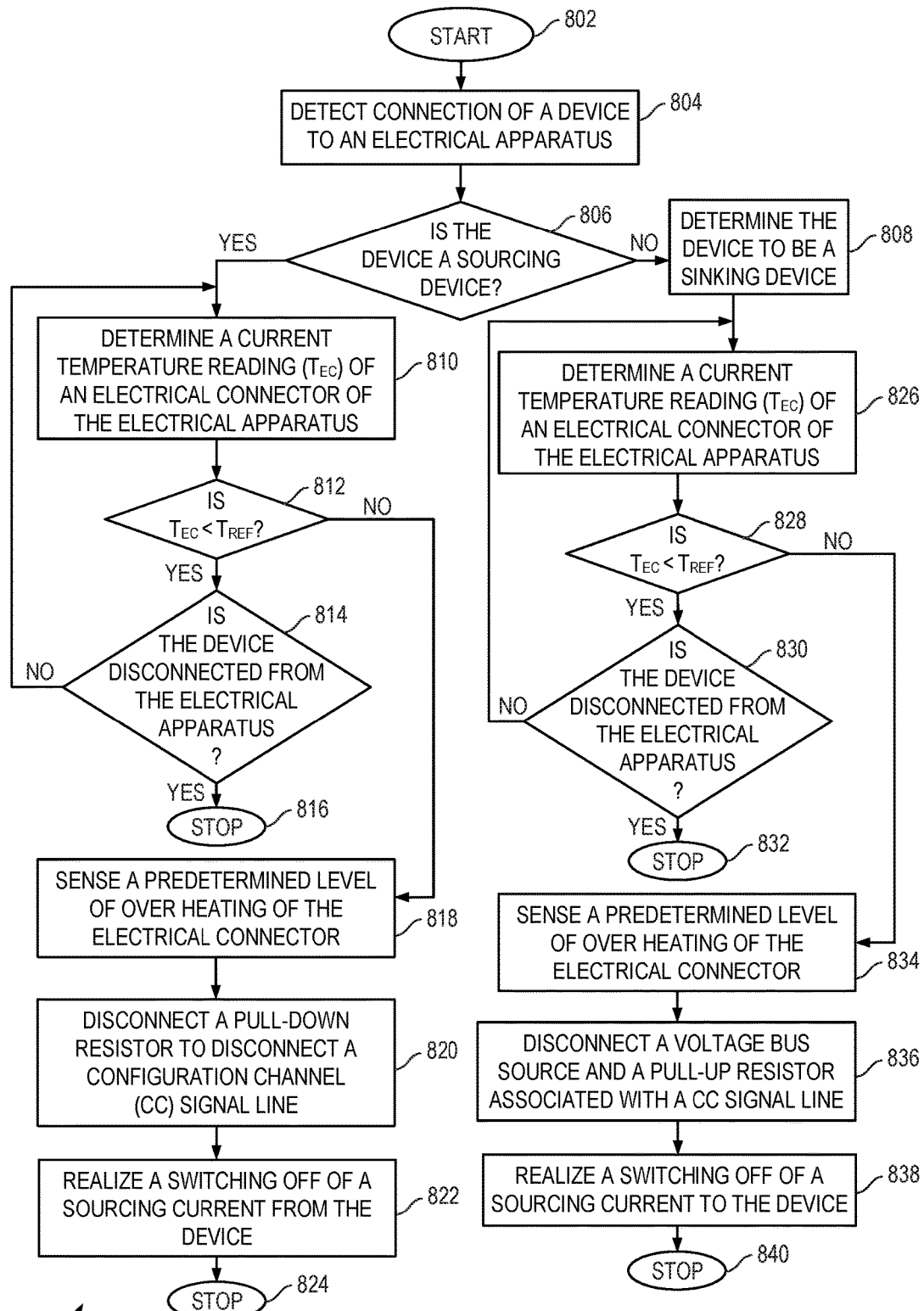
FIG. 8 illustrates an example flow diagram of a method for protecting an electrical apparatus from connector overheating during current sinking and current sourcing operations, in accordance with another example embodiment.

FIG. 8 illustrates an example flow diagram of a method 800 for protecting electrical apparatuses from connector overheating during current sinking and/or current sourcing operations, in accordance with another example embodiment. The method 800 starts at 802.

At 804, the method 800 detects connection of a device to an electrical apparatus. The device may be power-charging cable, a USB flash drive, a camera, a printer device or any such device.

At 806, the method 800 determines if the connected device is a sourcing device (i.e. a current source). If the connected device is a sourcing device then 810 is performed. If the connected device is not a sourcing device, then the method 800 determines the connected device to be a sinking device (i.e. a current sink) at 808.

At 810, the method 800 determines a current temperature reading (depicted as $T_{EC}$ in FIG. 8) of an electrical connector of the electrical apparatus.

At 812, the method 800 compares $T_{EC}$ with a reference temperature threshold value (depicted as $T_{REF}$ in FIG. 8). If $T_{EC}$ is less than $T_{REF}$ then at 814, the method 800 determines if the device is disconnected from the electrical apparatus or not. If the device is disconnected, then the method 800 stops at 816. If the device is not disconnected, then the method 800 repeats 810, 812 and 814 until $T_{EC}$ is greater than $T_{REF}$ or the device is disconnected.

If $T_{EC}$ is greater than $T_{REF}$ then the method 800 senses a predetermined level of overheating of the electrical connector at 818. At 820, the method 800 disconnects a pull-down resistor associated with a CC signal line (by either using an interrupt signal or directly using a switch) to disconnect the CC signal line. As explained, the disconnection of the CC signal line serves to indicate to the power source to switch off the sourcing current (i.e. supply of power) to the electrical apparatus. At 822, the method 800 realizes a switching off of a sourcing current from the device. The method stops at 824.

If the device is determined to be a sinking device at 808, then 826 is performed. At 826, the method 800 determines a current temperature reading (i.e. $T_{EC}$) of an electrical connector of the electrical apparatus. At 828, the method 700 compares $T_{EC}$ with a reference temperature threshold value (i.e. $T_{REF}$). If $T_{EC}$ is less than $T_{REF}$ then at 830, the method 800 determines if the device is disconnected from the electrical apparatus or not. If the device is connected, then the method 800 stops at 832. If the device is not disconnected, then the method 800 repeats 826, 828 and 830 until $T_{EC}$ is greater than $T_{REF}$ or the device is disconnected.

If $T_{EC}$ is greater than $T_{REF}$ then the method 800 senses a predetermined level of overheating of the electrical connector at 834. At 836, the method 800 disconnects a voltage bus ($V_{BUS}$) source and disconnects the CC line pull-up resistor. At 838, the method 800 realizes switching off a sourcing current to the device. The method stops at 840.

One or more operations disclosed in methods 700 and 800 can be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created (for example, cut-off temperature of the electrical connector or reference temperature threshold value) and used during implementation of the disclosed methods or apparatuses can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 9:
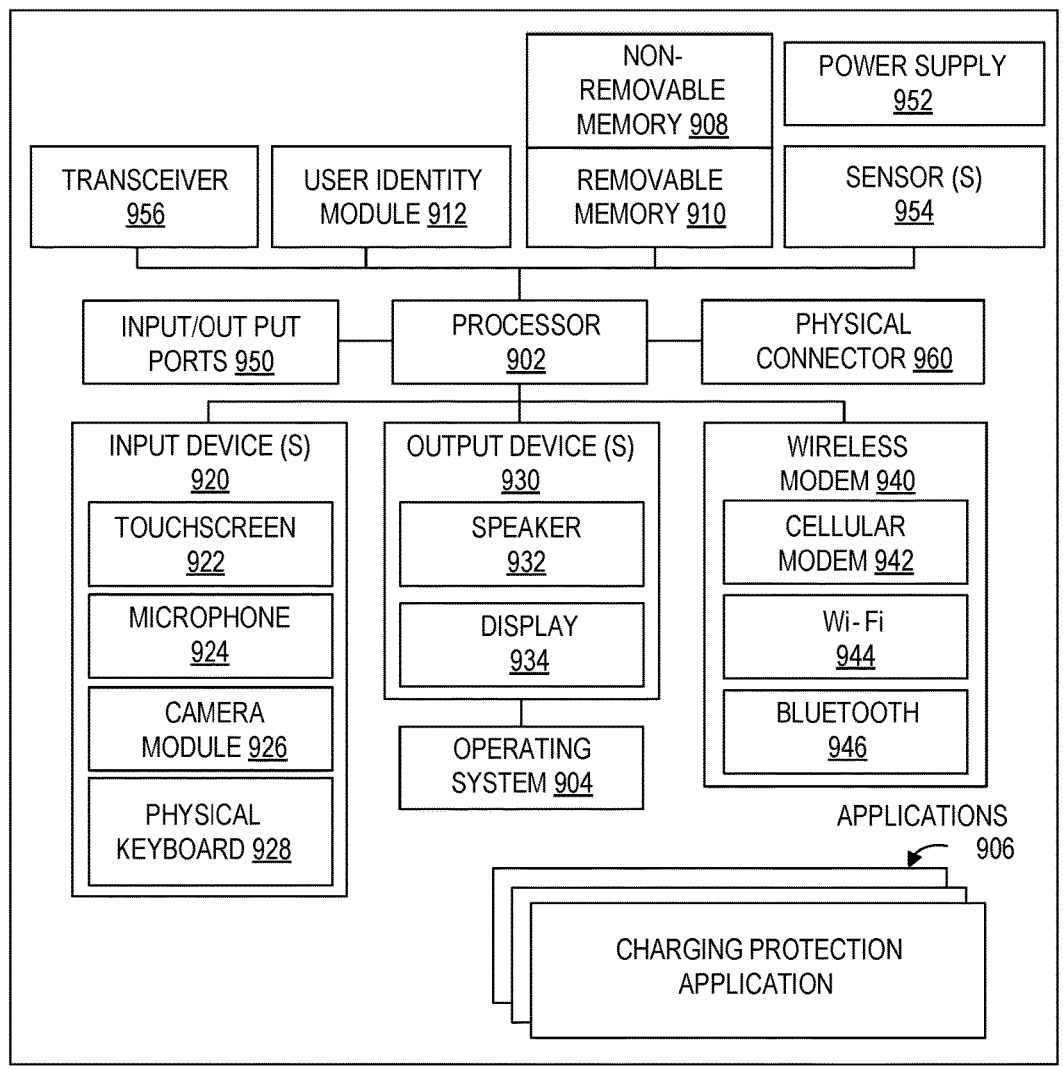
FIG. 9 illustrates an example of a mobile device capable of implementing example embodiments described herein.

Referring now to FIG. 9, a schematic block diagram of a mobile device 900 is shown that is capable of implementing embodiments of techniques for protecting electrical apparatuses during charging operations as described herein. The mobile device 900 as illustrated and hereinafter described is merely illustrative of one type of device and shall not be taken to limit the scope of the embodiments. As such, it should be appreciated that at least some of the components described below in connection with the mobile device 900 may be optional and thus in an example embodiment may include more, less or different components than those described in connection with the example embodiment of FIG. 9. As such, among other examples, the mobile device 900 could be any of device from among mobile electronic devices, such as for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 900 includes a controller or a processor 902 (e.g., a signal processor, microprocessor, ASIC, or other control and processing logic circuitry) for performing tasks such as signal coding, data processing, image processing, input/output processing, power control, and/or other functions. An operating system 904 controls the allocation and usage of the components of the mobile device 900 and support for one or more applications programs (see, applications 906), configured to support connector overheating protection (for example, charging protection application including computer program code configured to disconnect the pull-down resistor upon receiving the interrupt signal or disable the $V_{BUS}$ source upon sensing the predetermined level of overheating of the electrical connector during charging operation) that implements one or more of the innovative features described herein. In addition to connector overheating protection application, the application programs may include common mobile computing applications (e.g., telephony applications, email applications, calendars, contact managers, web browsers, messaging applications) or any other computing application.

The illustrated mobile device 900 includes one or more memory components, for example, a non-removable memory 908 and/or removable memory 910. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the applications 906. Examples of data can include web pages, text, images, sound files, image data, video data to be sent to and/or received from one or more network servers or other devices via one or more wired or wireless networks. The mobile device 900 may further include a user identity module (UIM) 912. The UIM 912 may be a memory device having a processor built in. The UIM 912 may include, for example, a SIM, a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 900 can support one or more input devices 920 and one or more output devices 930. Examples of the input devices 920 may include, but are not limited to, a touch screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video image frames) and a physical keyboard 928. Examples of the output devices 930 may include, but are not limited to a speaker 932 and a display 934. Other possible output devices (not shown) can include piezoelectric or other haptic output devices. Some devices can serve more than one input/output function. For example, the touch screen 922 and the display 934 can be combined into a single input/output device.

In an embodiment, the camera module 926 may include a digital camera capable of capturing a series of image frames. In some implementations, the camera module 926 may include two or more cameras, for example, a front camera and a rear camera positioned on two sides of the mobile device 900 (e.g., in a mobile device). As such, the camera module 926 includes all hardware, such as a lens or other optical component(s), and software for capturing a series of image frames. In an example embodiment, the camera module 926 may further include a processing element such as a co-processor, which assists the processor 902 in processing image frame data and an encoder and/or decoder for compressing and/or decompressing image data. In an embodiment, the camera module 926 may provide live image data (viewfinder image data) to the display 934.

A wireless modem 940 can be coupled to one or more antennas (not shown in FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the mobile device and a public switched telephone network (PSTN).

The mobile device 900 can further include one or more input/output ports 950, a power supply 952, one or more sensors 954 for example, an accelerometer, a gyroscope, a compass, or an infrared proximity sensor for detecting the orientation or motion of the mobile device 900, a transceiver 956 (for wirelessly transmitting analog or digital signals) and/or a physical connector 960, which can be a USB port, IEEE 1394 (FireWire) port, and/or RS-232 port. The illustrated components are not required or all-inclusive, as any of the components shown can be deleted and other components can be added.

An aspect of an electrical apparatus comprises
an electrical connector comprising a shell and at least one signal pin, the at least one signal pin capable of controlling sinking or sourcing of current; and
a temperature sensor in direct contact with a physical part of the electrical connector, the temperature sensor configured to sense a predetermined level of overheating of the electrical connector and to indicate via the at least one signal pin to a power source to switch off the sourcing of current to the electrical apparatus.

In one embodiment of the electrical apparatus the temperature sensor is integrated in the shell of the electrical connector.

In one embodiment of the electrical apparatus, alternatively or in addition, the temperature sensor is disposed in direct contact with the at least one signal pin or with a pin substrate associated with the at least one signal pin.

In one embodiment of the electrical apparatus, alternatively or in addition, the electrical connector is a universal serial bus (USB) connector and wherein the at least one signal pin is a configuration channel (CC) pin of the USB connector.

In one embodiment of the electrical apparatus, alternatively or in addition, a CC signal line associated with the CC pin is disconnected upon sensing of the predetermined level of overheating of the electrical connector, the disconnection of the CC signal line serving as the indication to the power source to switch off the sourcing of current.

In one embodiment of the electrical apparatus, alternatively or in addition, the temperature sensor is configured to:
determine a current temperature reading for the electrical connector;
compare the current temperature reading with a reference temperature threshold value, wherein the predetermined level of overheating of the electrical connector is sensed if the current temperature reading is greater than the reference temperature threshold value; and
provide an interrupt signal for disconnecting the CC signal line upon sensing of the predetermined level of overheating of the electrical connector.

In one embodiment, alternatively or in addition, the electrical apparatus further comprises
a memory comprising computer program code; and
a processor configured to execute the computer program code to cause the electrical apparatus to disconnect a pull-down resistor associated with the CC signal line upon receiving the interrupt signal, wherein the disconnection of the pull-down resistor is configured to disconnect the CC signal line.

In one embodiment, alternatively or in addition, the electrical apparatus further comprises a switch capable of being controlled by the temperature sensor, the switch configured to disconnect the CC signal line if the predetermined level of overheating of the electrical connector is sensed by the temperature sensor.

In one embodiment, alternatively or in addition, the electrical apparatus further comprises a user interface configured to display a notification alerting a user of the electrical apparatus of the switching off of the sourcing of current.

In one embodiment of the electrical apparatus, alternatively or in addition, the electrical apparatus is one of a mobile phone, a smartphone, a laptop, a wearable device, a tablet computer, a camera device and a personal digital assistant.

Another aspect of an electrical apparatus comprises
an electrical connector comprising a shell and at least one signal pin, the at least one signal pin capable of controlling sinking or sourcing of current; and
a temperature sensor in direct contact with a physical part of the electrical connector, the temperature sensor configured to sense a predetermined level of overheating of the electrical connector and cause a switching off of a sourcing of current from the electrical apparatus to a sinking device.

In one embodiment of the electrical apparatus the temperature sensor is integrated in the shell of the electrical connector or is disposed in direct contact with the at least one signal pin or with a pin substrate associated with the at least one signal pin.

In one embodiment of the electrical apparatus, alternatively or in addition, the electrical connector is a universal serial bus (USB) connector and wherein the at least one signal pin is a configuration channel (CC) pin of the USB connector.

In one embodiment of the electrical apparatus, alternatively or in addition, a voltage bus ($V_{BUS}$) source is disconnected from the electrical connector upon sensing of the predetermined level of overheating of the electrical connector, the disconnection of the $V_{BUS}$ source configured to cause switching off of the sourcing of current to the sinking device.

In one embodiment, alternatively or in addition, the electrical apparatus further comprises
a memory comprising computer program code; and
a processor configured to execute the computer program code to cause the electrical apparatus to disconnect a pull-up resistor associated with the CC signal line upon disconnection of the $V_{BUS}$ source from the electrical connector, wherein the disconnection of the pull-up resistor is configured to disconnect the CC signal line indicating the switching off of the source of current to the sinking device.

In one embodiment, alternatively or in addition, the electrical apparatus further comprises a user interface configured to display a notification alerting a user of the electrical apparatus of the switching off of the sourcing of the current to the sinking device.

An embodiment of a method comprises detecting, by an electrical apparatus, a connection of a sinking device or a sourcing device with an electrical connector disposed in the electrical apparatus, a temperature sensor in direct contact with a physical part of the electrical connector;

monitoring, by the electrical apparatus, a temperature of the electrical connector using the temperature sensor upon detecting the connection, the monitoring of the temperature performed to sense a predetermined level of overheating of the electrical connector; and causing, by the electrical apparatus, a switching off of a source of current if the electrical apparatus is sinking current from the sourcing device or switching off of a sourcing of current to the sinking device upon sensing the predetermined level of overheating of the electrical connector.

In one embodiment of the method the temperature sensor is integrated in a shell of the electrical connector or is disposed in direct contact with at least one signal pin of the electrical connector or with a pin substrate associated with the at least one signal pin of the electrical connector.

In one embodiment of the method, alternatively or in addition, wherein the electrical connector is a universal serial bus (USB) connector and wherein the at least one signal pin is a configuration channel (CC) pin of the USB connector.

In one embodiment, alternatively or in addition, the method comprises effecting, by the electrical apparatus, one of:

disconnection of a CC signal line associated with the CC pin upon sensing of the predetermined level of overheating of the electrical connector to cause switching off of the source of current when sinking current from the sourcing device; and disconnection of a voltage bus ($V_{BUS}$) source from the electrical connector upon sensing of the predetermined level of overheating of the electrical connector to cause switching off of the sourcing of current to the sinking device.

Various example embodiments offer, among other benefits, techniques for protecting an electrical connector from damage from overheating which might warrant replacement of the electrical connector or in some scenarios of the electrical apparatus. The various embodiments disclosed herein suggest integrating a temperature sensor in the electrical connector and thereby continuously monitoring the temperature of the electrical connector. Further, the use of the temperature sensor detects abnormal heating, which then is used to indicate to the power source to stop supplying sourcing current or power. Additionally, a user may be notified on a display of the electronic device indicating disconnection of the electronic device from the power source.

It is noted that various example embodiments as described herein may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices such as disks, thumb drives, memory etc. The software can be suitable for execution on a parallel processor or a serial processor such that the method operations may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The embodiments illustrated and described herein as well as embodiments not specifically described herein but within the scope of aspects of the invention constitute exemplary apparatus means for protecting electrical apparatuses during charging operations. For example, the elements illustrated and described with reference to FIGS. 1 and 9, when configured, under control of the processor 106 and program code in the memory 108 to perform the operations illustrated and described with reference to FIGS. 1, 2, 3, 4, 5 and 6, constitute an exemplary connector overheating protection application means for detecting a connection of sinking device or a sourcing device with an electrical connector disposed in the electrical apparatus, a temperature sensor in direct contact with a physical part of the electrical connector, for monitoring a temperature of the electrical connector using the temperature sensor upon detecting the connection, the monitoring of the temperature performed to sense a predetermined level of overheating of the electrical connector, and for causing a switching off of a source of current if the electrical apparatus is sinking current from the sourcing device or switching off a sourcing of current to the sinking device upon sensing the predetermined level of overheating of the electrical connector.

The benefits and advantages described above may relate to one embodiment or may relate to several embodiments. The embodiments are not limited to those that solve any or all of the stated problems or those that have any or all of the stated benefits and advantages.

The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An electrical apparatus comprising:
an electrical connector comprising a shell and at least one signal pin, the at least one signal pin capable of controlling sinking or sourcing of current; and
a temperature sensor in direct contact with a physical part of the electrical connector, the temperature sensor configured to:
sense a predetermined level of overheating of the electrical connector; and
upon sensing the predetermined level of overheating of the electrical connector, disconnect a signal line associated with the at least one signal pin, the disconnecting serving as an indication to a power source to switch off the sourcing of current to the electrical apparatus.

2. The electrical apparatus of claim 1, wherein the temperature sensor is integrated in the shell of the electrical connector.

3. The electrical apparatus of claim 1, wherein the temperature sensor is disposed in direct contact with the at least one signal pin or with a pin substrate associated with the at least one signal pin.

4. The electrical apparatus of claim 1, wherein the electrical connector is a universal serial bus (USB) connector and wherein the at least one signal pin is a configuration channel (CC) pin of the USB connector.

5. The electrical apparatus of claim 4, wherein a CC signal line associated with the CC pin is disconnected upon the sensing of the predetermined level of overheating of the electrical connector.

6. The electrical apparatus of claim 4, wherein the temperature sensor is configured to:
determine a current temperature reading for the electrical connector;
compare the current temperature reading with a reference temperature threshold value, wherein the predetermined level of overheating of the electrical connector is sensed if the current temperature reading is greater than the reference temperature threshold value; and
provide an interrupt signal for disconnecting the CC signal line upon sensing of the predetermined level of overheating of the electrical connector.

7. The electrical apparatus of claim 6, further comprising:
a memory comprising computer program code; and
a processor configured to execute the computer program code to cause the electrical apparatus to disconnect a pull-down resistor associated with the CC signal line upon receiving the interrupt signal, wherein the disconnection of the pull-down resistor is configured to disconnect the CC signal line.

8. The electrical apparatus of claim 4, further comprising:
a switch capable of being controlled by the temperature sensor, the switch configured to disconnect the CC signal line if the predetermined level of overheating of the electrical connector is sensed by the temperature sensor.

9. The electrical apparatus of claim 4, further comprising:
a user interface configured to display a notification alerting a user of the electrical apparatus of the switching off of the sourcing of current.

10. The electrical apparatus of claim 9, wherein the electrical apparatus is one of a mobile phone, a smartphone, a laptop, a wearable device, a tablet computer, a camera device and a personal digital assistant.

11. An electrical apparatus comprising:
an electrical connector comprising a shell and at least one signal pin, the at least one signal pin capable of controlling sinking or sourcing of current;
a temperature sensor in direct contact with a physical part of the electrical connector, the temperature sensor configured to sense a predetermined level of overheating of the electrical connector and upon sensing the predetermined level of overheating of the electrical connector, disconnect a signal line associated with the at least one signal pin, the disconnecting serving as an indication to a power source to switch off the sourcing of current to the sinking device.

12. The electrical apparatus of claim 11, wherein the temperature sensor is integrated in the shell of the electrical connector or is disposed in direct contact with the at least one signal pin or with a pin substrate associated with the at least one signal pin.

13. The electrical apparatus of claim 11, wherein the electrical connector is a universal serial bus (USB) connector and wherein the at least one signal pin is a configuration channel (CC) pin of the USB connector.

14. The electrical apparatus of claim 13, wherein a voltage bus ($V_{BUS}$) source is disconnected from the electrical connector upon sensing of the predetermined level of overheating of the electrical connector, the disconnection of the $V_{BUS}$ source configured to cause switching off of the sourcing of current to the sinking device.

15. The electrical apparatus of claim 14, further comprising:
a memory comprising computer program code; and
a processor configured to execute the computer program code to cause the electrical apparatus to disconnect a pull-up resistor associated with the CC signal line upon disconnection of the $V_{BUS}$ source from the electrical connector, wherein the disconnection of the pull-up resistor is configured to disconnect the CC signal line indicating the switching off of the source of current to the sinking device.

16. The electrical apparatus of claim 15, further comprising:
   a user interface configured to display a notification alerting a user of the electrical apparatus of the switching off of the sourcing of the current to the sinking device.

17. A method comprising:
   detecting, by an electrical apparatus, a connection of a sinking device or a sourcing device with an electrical connector disposed in the electrical apparatus, a temperature sensor in direct contact with a physical part of the electrical connector;
   monitoring, by the electrical apparatus, a temperature of the electrical connector using the temperature sensor upon detecting the connection, the monitoring of the temperature performed to sense a predetermined level of overheating of the electrical connector; and
   causing, by the electrical apparatus, switching off of a sourcing of current to the sinking device upon sensing the predetermined level of overheating of the electrical connector.

18. The method of claim 17, wherein the temperature sensor is integrated in a shell of the electrical connector or is disposed in direct contact with at least one signal pin of the electrical connector or with a pin substrate associated with the at least one signal pin of the electrical connector.

19. The method of claim 18, wherein the electrical connector is a universal serial bus (USB) connector and wherein the at least one signal pin is a configuration channel (CC) pin of the USB connector.

20. The method of claim 19, further comprising:
   effecting, by the electrical apparatus, one of:
      disconnection of a CC signal line associated with the CC pin upon sensing of the predetermined level of overheating of the electrical connector to cause switching off of the source of current when sinking current from the sourcing device; and
      disconnection of a voltage bus ($V_{BUS}$) source from the electrical connector upon sensing of the predetermined level of overheating of the electrical connector to cause switching off of the sourcing of current to the sinking device.

\* \* \* \* \*